(12) United States Patent
Kodama et al.

(10) Patent No.: US 6,801,840 B2
(45) Date of Patent: Oct. 5, 2004

(54) STEERING CONTROL SYSTEM FOR VEHICLE

(75) Inventors: Kazumasa Kodama, Toyota (JP); Junji Kawamuro, Susono (JP); Takahiro Kojo, Susono (JP); Masatoshi Nakatsu, Susono (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/626,639

(22) Filed: Jul. 25, 2003

(65) Prior Publication Data

US 2004/0148076 A1 Jul. 29, 2004

(30) Foreign Application Priority Data

Jul. 26, 2002 (JP) .......................................... 2002-217733

(51) Int. Cl.[7] ................................................. G06F 7/00
(52) U.S. Cl. ............................... 701/21; 701/1; 701/41; 280/5.51; 180/428; 180/443
(58) Field of Search ............................... 701/1, 21, 41; 180/422, 428, 443, 446; 280/5.51

(56) References Cited

U.S. PATENT DOCUMENTS

| | | | | |
|---|---|---|---|---|
| 4,658,927 A | * | 4/1987 | Kanazawa | 180/422 |
| 4,747,055 A | | 5/1988 | Eto et al. | 701/1 |
| 4,880,072 A | * | 11/1989 | Sakamoto et al. | 180/415 |
| 6,016,881 A | * | 1/2000 | Sakai et al. | 180/204 |
| 6,052,633 A | * | 4/2000 | Fukuyama et al. | 701/41 |
| 2003/0114970 A1 | * | 6/2003 | Hara | 701/41 |

FOREIGN PATENT DOCUMENTS

| | | |
|---|---|---|
| DE | 198 41 913 | 3/2000 |
| JP | 11-334604 | 12/1999 |
| JP | 11-334628 | 12/1999 |

* cited by examiner

*Primary Examiner*—Gertrude A. Jeanglaude
(74) *Attorney, Agent, or Firm*—Oblon, Spivak, McClelland, Maier & Neustadt, P.C.

(57) ABSTRACT

A angle sensor 103 identifies a angle phase of a rotatable member based on a kind of an identified pattern of the angle phase to detect an angular position of a steering shaft driven by a motor 6. A steering controller 100 identifies a rotational direction based on an identified pattern output of the angle and performs a sampling of the pattern output at a predetermined interval, identifies an order of combination order of the identified pattern of an angle phase in a first sampling and a second sampling following to the first sampling, and determines a pattern exchange number with the rotational direction from the order in the first sampling to the order in the second sampling. The steering controller 100 adds a number corresponding to the pattern exchange number to a counting number when the rotational direction is plus and decrease a number corresponding to the pattern exchange number from the counting number when the rotational direction is minus in order to identify the angular position of the steering shaft by the counted number.

7 Claims, 10 Drawing Sheets

| Vehicle Speed (V) | $V_1$ | $V_2$ | $V_3$ | ............ | $V_n$ |
|---|---|---|---|---|---|
| Steering Angle Exchanging Ratio ($\alpha$) | $\alpha_1$ | $\alpha_2$ | $\alpha_3$ | . | $\alpha_n$ |

130

$\alpha = \theta/\varphi$    $\varphi$: Angular position of handle shaft $\theta$: Angular position of steering shaft

| $\Delta\theta \backslash V_s$ | $V_{s1}$ | $V_{s2}$ | $V_{s3}$ | $V_{s4}$ | ............ | $V_{sn}$ |
|---|---|---|---|---|---|---|
| $\Delta\theta_1$ | $\eta_{11}$ | $\eta_{12}$ | $\eta_{13}$ | $\eta_{14}$ | ............ | $H_{1n}$ |
| $\Delta\theta_2$ | $\eta_{21}$ | $\eta_{22}$ | $\eta_{23}$ | $\eta_{24}$ | ............ | $H_{2n}$ |
| $\Delta\theta_3$ | $\eta_{31}$ | $\eta_{32}$ | $\eta_{33}$ | $\eta_{34}$ | ............ | $H_{3n}$ |
| $\Delta\theta_4$ | $\eta_{41}$ | $\eta_{42}$ | $\eta_{43}$ | $\eta_{44}$ | ............ | $H_{4n}$ |
| .... | .... | .... | .... | .... | ............ | .... |
| $\Delta\theta_m$ | $\eta_{m1}$ | $\eta_{m2}$ | $\eta_{m3}$ | $\eta_{m4}$ | ............ | $\eta_{mn}$ |

$\eta$: Duty Ratio      $\theta'$: Target angular position of steering shaft $\Delta\theta = \theta' - \theta$      $\theta$: Present angular position of steering shaft

STEERING CONTROL SYSTEM FOR VEHICLE

INCORPORATION BY REFERENCE

The present application claims priority under 35 U.S.C. §119 to Japanese Patent Application No. 2002-217733, filed on Jul. 26, 2002. The contents of that application are incorporated herein by reference in their entirety.

BACKGROUND OF THE INVENTION

1. Field of the Invention

The invention relates to a steering control system for a vehicle, especially for an automobile.

2. Description of the Related Art

In a steering apparatus for a vehicle, especially a power steering apparatus for an automobile, it is developed a variable gear ratio system changing a converting ratio of a steering angle from a handle operation angle according to a driving stage of the vehicle without fixing the converting ratio to 1:1. The driving stage is detected by a vehicle speed, for example. During a high speed driving, it is possible for the driving to be stabilized by preventing the steering angle from being large rapidly according to an increasing of the handle operation angle by the way of decreasing the converting ratio at the high speed driving. On the other hand, during a low speed driving, to increase the converting ratio of the steering can decrease a handle rotation to reach an end of the steering angle so that it is easy for a driver to drive in a large steering angle operation such as a parking or a column parking.

It is well known for the variable gear ratio system to directly couple a handle shaft and a steering shaft by a gear transmission device with a variable gear ratio disclosed in, for example, the Japan laid-open publication No. 11-334604. This construction has a defect of a complex in the gear change mechanism of the gear transmission device. It is well known for the variable gear ratio system to separate the handle shaft and the steering shaft by the way of driving the steering shaft by an actuator such as a motor and so on disclosed in, for example, the Japanese laid-open publication No. 11-334628. A computer of this system calculates the steering angle finally needed according to the handle operation angle detected by an angle detector and the converting ratio of the steering angle, and controls to drive the actuator or the motor for the steering shaft separated mechanically from the handle shaft in order to get the calculated steering angle.

In the well known steering control system, a precise monitoring of an angular position of the steering shaft is needed. The detection of the angular position is performed by an angle sensor such as a rotary encoder and so on. It is used for counting a pulse output to detect an absolute angular position in an incremental encoder. The counting is performed by sampling the encoder pulse at predetermined interval to add or decrease one in the counter according to receiving one pulse therein. However, it is happened to rotate the encoder accordingly to two pulses in sudden acceleration of the motor by a rapid handling or a shock. The counter counts only one pulse in one sampling even though in this sudden situation so that an accuracy of detecting the angle deteriorates to cause the incorrect steering angle control.

SUMMARY OF THE INVENTION

In view of the previously mentioned circumstances, it is an object of the present invention to provide a steering control system for a vehicle increasing an accuracy of detecting an angular position.

It is second object of the present invention to provide a steering control system for a vehicle increasing an accuracy of detecting an angular position by the way of eliminating a counting by sudden rotation of a steering motor.

It is third object of the present invention to provide a steering control system for a vehicle performing correctly an angle identifying operation of an angular position of steering shaft according to a motor rotation number.

In order to achieve the above and other objects, the present invention provides a steering control system for a vehicle comprising at least an angle detector and a steering controller. The steering controller identifies a rotational direction of the angle detector based on a pattern output, performs a sampling of the pattern output at a predetermined interval, identifies an order of combination order of the identified pattern of an angle phase in a first sampling and a second sampling following to the first sampling, and determines a pattern exchange number with the rotational direction. The steering controller adds a number corresponding to the pattern exchange number to a counting number when the rotational direction is plus and decrease a number corresponding to the pattern exchange number from the counting number when the rotational direction is minus. The steering controller has an angular position counter of steering shaft registering said angular position of steering shaft by the counting number. In the present invention, the detection of the angular position of steering shaft is performed by the angle detector or sensor identifying the phase of a rotation angle of the shaft based on the identified pattern of the angle phase. For example, the angle sensor has a rotatable member formed the identified pattern of the angle phase in the predetermined combination order at the same interval. In the present invention, the angle sensor is constructed to be able to be read the angle phase by the kind of the pattern exchange and to be used the counting number as the angle position of steering shaft. This is a kind of use of the incremental angle sensor, however, the present invention can perform the angle detection unenforceable by the well known angle sensor. When the sampling of the detected pattern of the angle phase is performed at neighboring pattern, it is possible for the angle sensor to detect an advancing number or retracting number in the order of the formed pattern to identify the rotational advancing angle generated in the angle sensor at the sampling interval by the pattern exchange number. Therefore, in the present invention, it detects the pattern exchange number and an exchanging direction from the order of the first sampling to the order of the second sampling, and it adds the number corresponding to the pattern exchange number to the counting number when the rotational direction is plus and decreases the number corresponding to the pattern exchange number from the counting number when the rotational direction is minus. Thereby, when the angle sensor is rotated in more than two patterns at only one sampling by the sudden acceleration of the motor caused by a rapid handling or a shock, the angle sensor can add or decrease in the counter according to the pattern exchange number to be able to detect the angular position precisely to increase the accuracy of the angle control.

It happen a suddenly large rotation of the motor by the shock against a steering control in the driving to generate a disorder of the rotation of the steering shaft independently from the handle operation. The disorder should be eliminated at the identification of the angular position of steering shaft for the accuracy of the steering control. The second aspect of the invention is that the steering controller of the present invention includes a counter control means performing an prohibiting operation prohibiting the operation of adding or decreasing said pattern exchange number to or from the counting number in the angular position counter of steering shaft when an absolute number of the pattern exchange number is larger than a reference pattern exchange number. The function of the counter control means can eliminate the suddenly large advancing angle as abnormality to make the high accuracy of the angle position of steering shaft.

It is not abnormality to make a large motor rotation velocity at the rapid handling and to advance the angle phase corresponding to the motor rotation at the sampling interval. In this occasion, to perform the count prohibiting operation happens to make a decreasing the accuracy of the angular position of steering shaft. The third aspect of the present invention is that the steering control system has an angle velocity detecting member to calculating an angle velocity of a rotatable member of the angle sensor and the counter control means changes a set condition being set to perform the count prohibiting operation according to the calculated angle velocity. Thereby, the count prohibiting is performed at any time according to the motor rotation number to perform correctly the angle identifying operation of the angular position of steering shaft according to the motor rotation number. It can set a large reference pattern exchange number performing the count prohibiting operation according to the large angle velocity.

BRIEF DESCRIPTION OF THE DRAWINGS

Various other objects, features and many of the attendant advantages of the present invention will be readily appreciated as the same become better understood by reference to the following detailed description of the preferred embodiments when considered in connection with the accompanying drawings, in which.

DETAILED DESCRIPTION OF THE PREFERRED EMBODIMENTS

Figure 1:
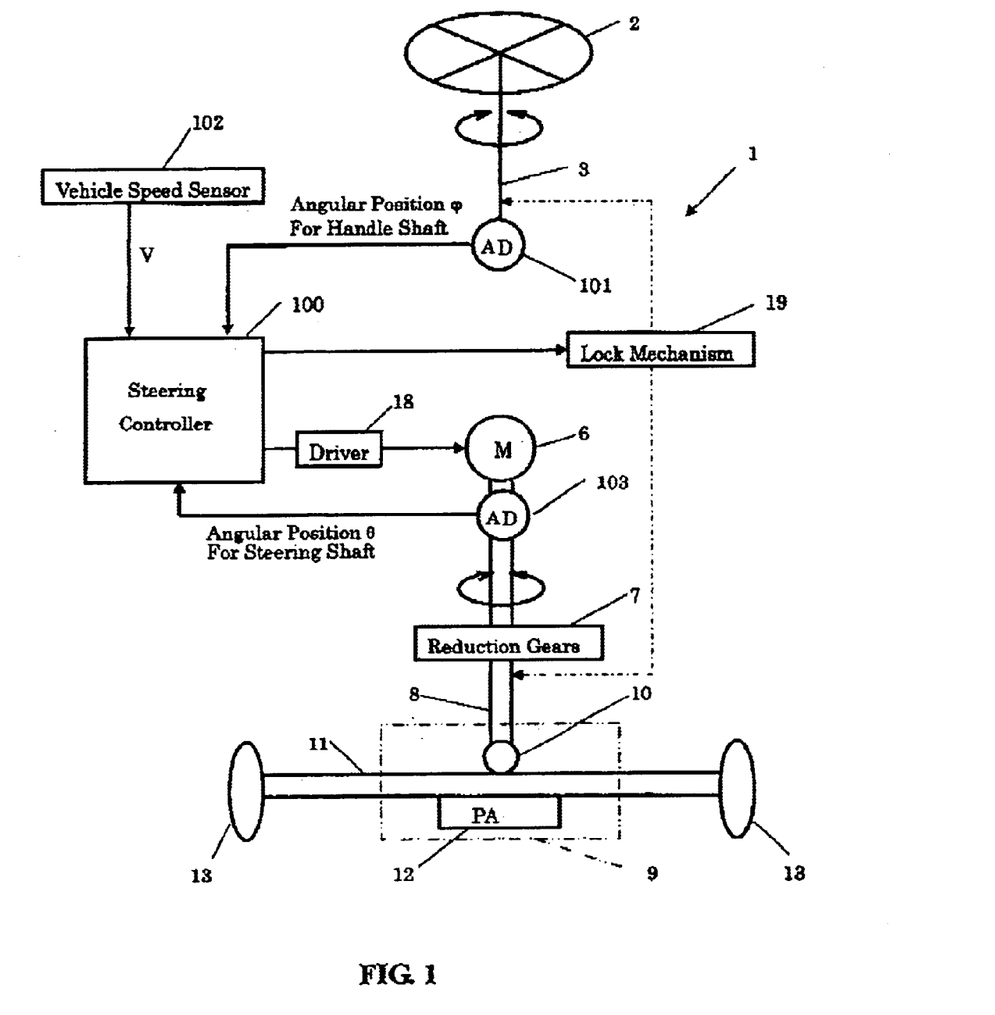
FIG. 1 is a schematic diagram showing a whole construction in the steering control system for a vehicle of the present invention.

A preferred embodiment of a steering control system for a vehicle according to the aforementioned invention will be described referring to appending Figures. FIG. 1 shows a schematic diagram explaining a whole construction in the steering control system for a vehicle applicable of the present invention. The "vehicle" is explained as an automobile that is one example for the present invention, however not limited to the automobile but can be applicable to the other vehicle. The steering control system for the vehicle 1 has a handle shaft 3, connected directly to a steering handle 2, and a steering shaft 8. The handle shaft 3 and the steering shaft 8 are separate mechanically. The steering shaft 8 is driven by a motor 6 as an actuator. An end of the steering shaft 8 extends into a steering gear box 9. A pinion 10 is rotated with the steering shaft 8 to reciprocate a rack bar 11 axially in order to change a steering angle of each steered wheel 13, 13. In the embodiment of the steering control system for the vehicle of the present invention, the reciprocating movement of the rack bar 11 is performed by a power steering device 12 such as a well-known hydraulic or electric power assisting mechanism. An angular position $\phi$ of the handle shaft 3 is detected by an angle detector 101 consisting of a well-known angle detector such as a rotary encoder and so on. An angular position $\theta$ of the steering shaft 8 is detected by an angle detector 103 consisting of a well-known angle detector such as a rotary encoder and so on. In the embodiment, a vehicle speed detector or sensor 102 is equipped for detecting a vehicle speed V to have a function of a driving statge detection for the vehicle. The vehicle speed sensor 102 consists of a rotation detector, i.e. a rotary encoder or a tachometer, to detect a rotation of the steered wheel 13. A steering controller 100 determines a target angular position $\theta'$ of the steering shaft 8 according to the detected angular position $\phi$ of the handle shaft 3 and the detected vehicle speed V to control an operation of the motor 6 through a motor driver 18 in order that the angular position $\theta$ of the steering shaft 8 becomes to be the target angular position $\theta'$. Besides, between the handle shaft 3 and the steering shaft 8 is a lock mechanism 19 changeable from a lock state combining two shafts to an un-lock state disengaging the lock state. In the lock state, the rotation of the handle shaft 3 is transmitted to the steering shaft 8 without exchange of the rotation of the handle shaft 3, i.e. a steering angle converting ratio is 1:1, being able to a manual steering. The change to the lock state in the lock mechanism 19 is performed by an order from the steering controller 100 at occurrence of malfunction.

Figure 2:
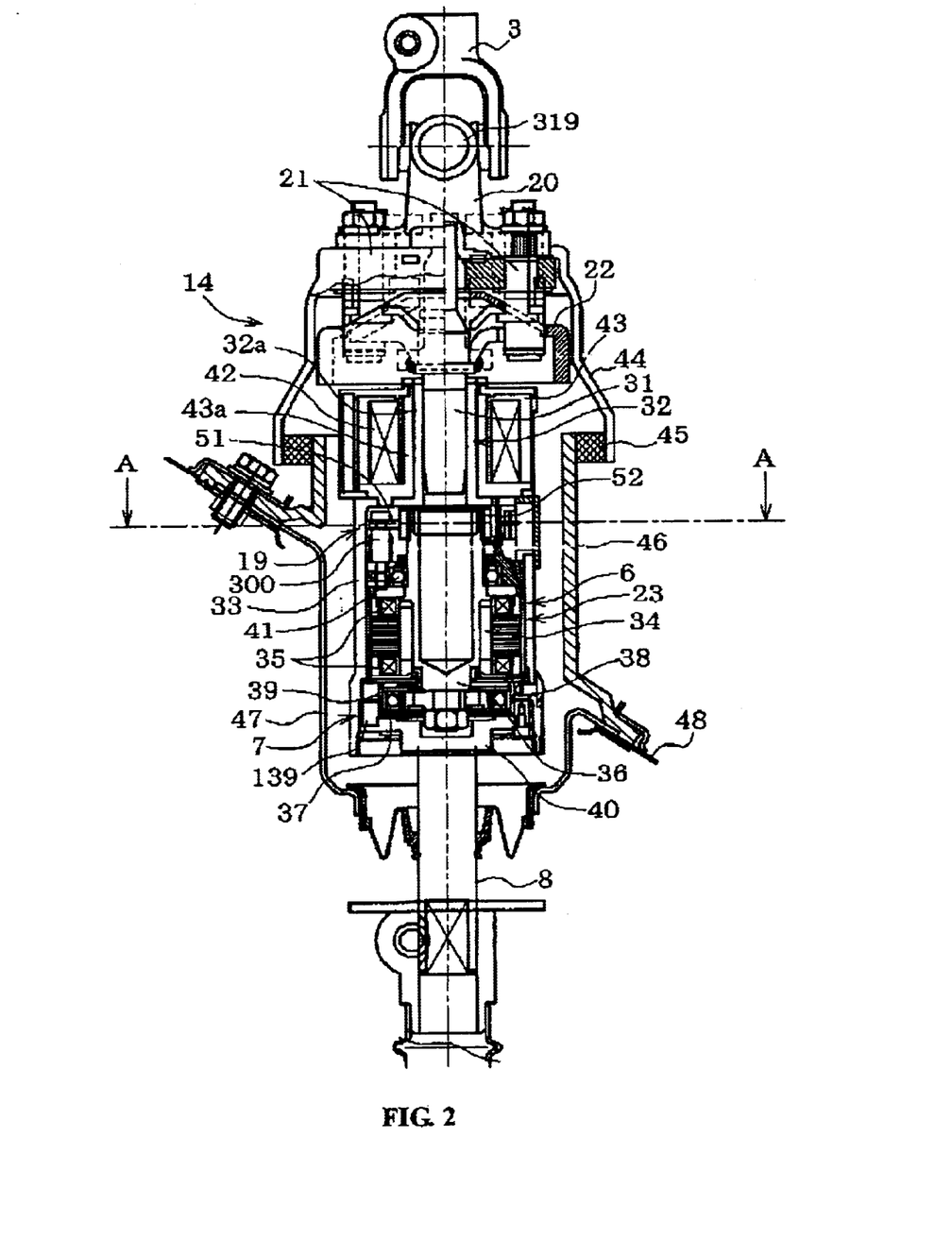
FIG. 2 is a cross sectional view of an embodiment of a driving unit of the present invention.

FIG. 2 shows a constructive example of a driving unit for the steering shaft 8 by the motor 6 mounting on the vehicle. In the driving unit 14, a motor case 33 is rotated with the motor 6, mounted inside the motor case 33, by a rotation of the handle shaft 3 according to the rotation of the handle 2. The handle shaft 3 is connected to an input shaft 20 through a universal joint 319, the input shaft is connected to a first coupling member 22 through volts 21, 21. A pin 31 is integral with the first coupling member 22 at a unit. A projection of the pin 31 is secured into a sleeve 37a extending outwardly from a center portion of one board of a second coupling 32. The tubular motor case 33 is integral with the other board of the second coupling 32. A numeral 44 is a cover consisting of a rubber or resin and is rotated with the handle shaft 3. A numeral 46 is a case covering the driving unit 14 being integral with a cockpit panel 48 and a numeral 45 is a seal ring sealing between the cover 44 and the case 46. Inside the motor case 33 is assembled a stator 23 of the motor 6 including coils 35, 35. Inside the stator 23 is rotatably assembled a motor output shaft 36 through a bearing 41. Outside the motor output shaft 36 is integral with an armature 34 of a permanent magnet, and the armature 34 is disposed between coils 35, 35. Coils 35, 35 are connected with a loading terminal 50 and a voltage is charged to coils 35, 35 at the load terminal 50 (see FIG. 3) through a load cable 42. The motor 6 consists of a brushless motor and the load cable 42 is an integral cable of plural single wires to charge individually each phase of coils 35, 35. A cable case 43 having a hub 43a is mounted in the rear of the motor case 33 and the load cable 42 wound spirally is installed within the cable case 43. The other end of load cable 42 at opposite to the load terminal 50 is fixed to the hub 43a of the cable case 43. At the rotation of the handle shaft 3 with the motor case 33 and the load terminal 50, the load cable 42 serves to absorb the rotation of the motor case 33 by winding or feeding itself.

The rotation of the motor output shaft 36 is transmitted to the steering shaft 8 through reduction gears 7 to be reduced to a predetermined ratio of 1/50. In the present invention, reduction gears 7 are constructed with a harmonic drive mechanism. To the motor output shaft 36 is fixed a bearing 37 with an oval inner race, and a flexible thin outer gear 38 is inserted out of the bearing 37. Inner gears 39, 139 integral with the steering shaft 8 through a coupling 40 are engaged with the outer gear 38 outside thereof. Inner gears 39, 139 comprise first inner gear 39 and second inner gear 139 arranged coaxially, said first inner gear 39 is fixed to the motor case 33 to be rotated therewith and said second inner gear 139 is not fixed to the motor case 33 to be rotatable relatively. A difference of numbers of teeth between the inner gear 39 and the outer gear 38 meshed therewith is zero so that there is no relative rotation between them, i.e. first inner gear 39, the motor case 33 and the handle shaft 3 are connected to the motor output shaft 36 with a possible relative rotation. On the other hand, the number of teeth of the second inner gear 139 is larger than that of the outer gear 38, for example former is two larger than latter. Therefore, where the number of the inner gear 39 is N and the number difference between the outer and the inner gears 38, 139 is n, the rotation of the motor output shaft 36 is transmitted to the steering shaft 8 at reduction of n/N. Said inner gears 39, 139 are coaxially arranged with the input shaft 20 of the handle shaft 3, the motor output shaft 36 and the steering shaft 8.

Figure 3:
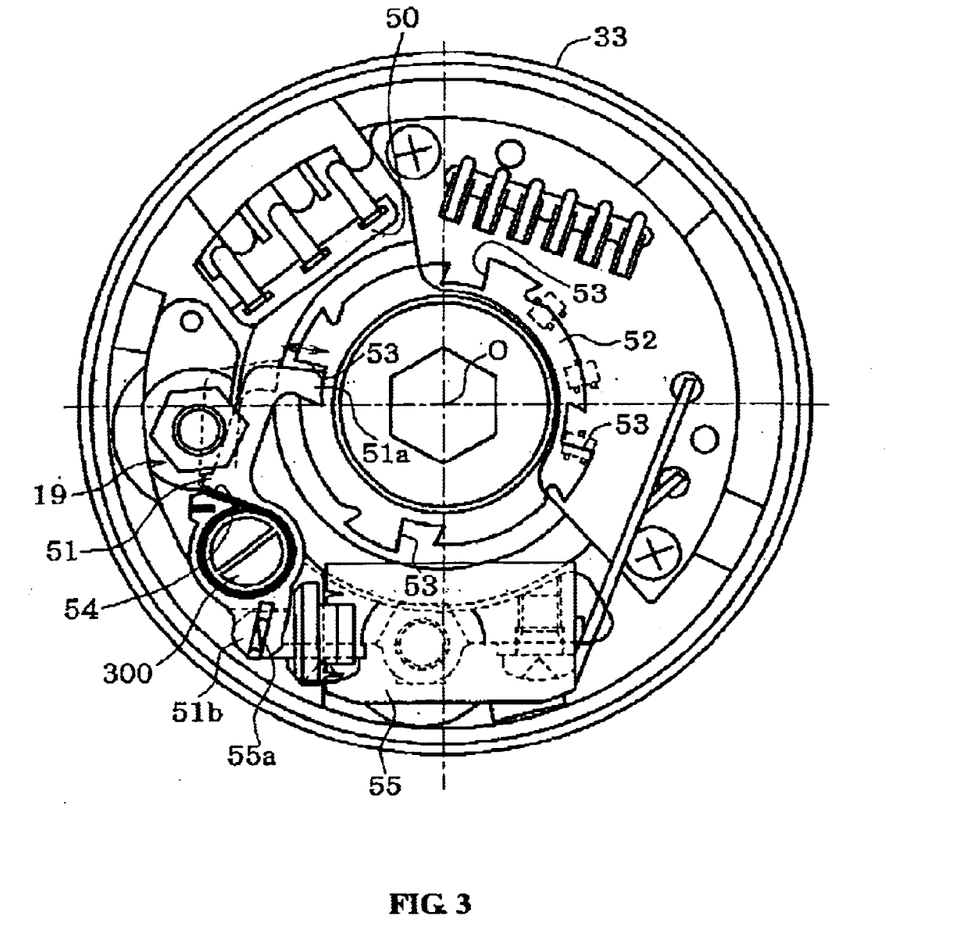
FIG. 3 is a A—A cross sectional view in FIG. 2.

The lock mechanism 19 comprises a lock member 51 and a lock receiving member 52. The lock member 51 is fixed to a lock base, i.e. the motor case 33 in the present invention, which can not be rotated independently with the handle shaft 3 and the lock receiving member 52 is mounted on a lock receiving base, i.e. the motor output shaft 36 in the present invention. Referring to FIG. 3, the lock member 51 moves between a lock position and an un-lock position, the lock member 51 engages to the lock receiving portion 53 formed in the lock receiving member 52 in the lock position and disengages thereto in the un-lock position. In the present invention, a plurality of the lock receiving portion 53 are formed peripherally on the lock receiving member 52 rotated with the steering shaft 8 as a unit. And a lock portion 51a formed at the end of the lock member 51 is selectively engaged with one of lock receiving portions 53 according to a phase of rotated angle of the steering shaft 8. The handle shaft 3 is connected to the motor case 33 without relative rotation through the coupling 22 and pin 31. At the un-lock stage between the lock member 51 and the lock receiving member 52, the motor output shaft 36 is rotated relatively to the motor output shaft 36 and the rotation thereof is transmitted to the first inner gear 39 and the second inner gear 139 through the outer gear 38. The first inner gear 39 is rotated at the same speed to the handle shaft 3 because it is not relatively rotated to the outer gear 38, therefore, it is rotated according to the handle operation. The second inner gear 139 transmits the rotation to the steering shaft to reduce it from the motor output shaft 36, performing the rotation of the steering shaft 8. At the lock stage between the lock member 51 and the lock receiving member 52, the motor output shaft 36 can not be rotated relatively to the motor case 33. Since the first inner gear is fixed to the motor case 33, the rotation of the handle shaft 3 is transmitted directly to the steering shaft 8 through the first inner gear 39, the outer gear 38 and the second inner gear 139 in this order.

Besides, the lock receiving member 52 is mounted on a peripheral surface of one end of the motor output shaft 36 and each of the lock receiving portions 53 are formed as a recess cut in radially from a peripheral surface of the lock receiving member 52. Referring to FIG. 2 and FIG. 3, the lock member 51 is rotatably mounted around a center of an axis parallel to the steering shaft 8 and a rear portion 51b of the lock member 51 is bound to a projected portion 55a of a solenoid 55. The lock member 51 is retracted to an original position by a spring member 54 when the solenoid is de-energized. Therefore, when the solenoid 55 is energized or de-energized, the lock portion 51a is advanced and retracted into and from the lock receiving member 52 for the lock stage and the un-lock stage. It can be selected the lock stage or the un-lock stage in energizing the solenoid 55, the present invention selects the un-lock stage for a safety driving when the solenoid 55 is energized. Therefore, when the solenoid 55 is de-energized by breaking a current, a driver can steer by manual at the lock stage by the spring member 54 for the safety driving.

Figure 4:
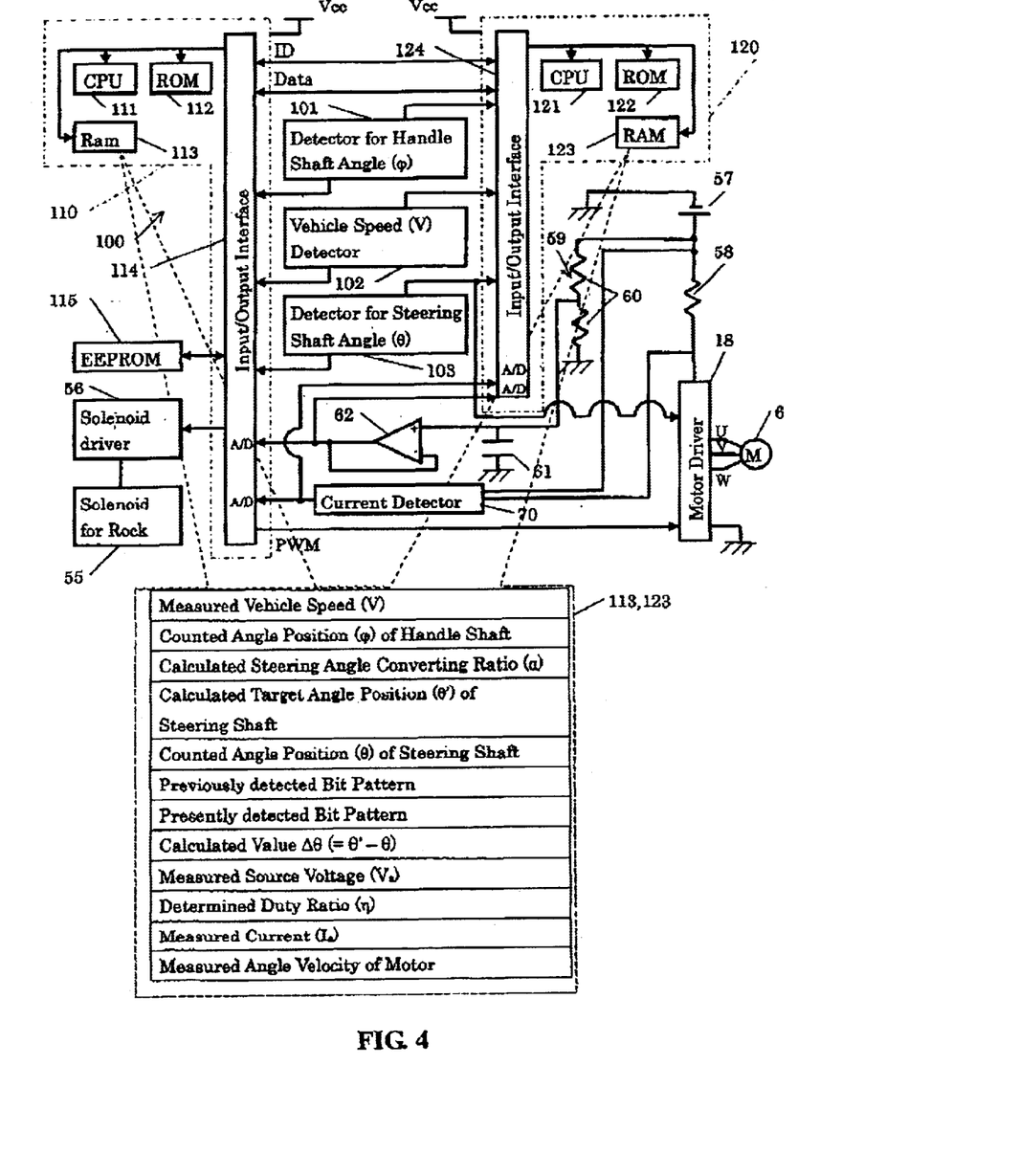
FIG. 4 is a block diagram showing an embodiment of an electrical construction in the steering control system for a vehicle of the present invention.

Referring to FIG. 4, the steering controller 100 is now described. Main parts of the steering controller are two micro computers 110 and 120. The main micro computer 110 comprises a main CPU 111, a ROM 112 installing a control program, a main RAM 113 as a working area of the main CPU 111, and an input/output interface 114. The sub micro computer 120 comprises a sub CPU 121, a ROM 122 installing a control program, a sub RAM 113 as a working area of the sub CPU 121, and an input/output interface 124. The main micro computer 110 controls directly an operation of the motor 6, i.e. an actuator, driving the steering shaft 8. The sub micro computer 120 operates datum, including a parameter calculation et al, needed for an operation control of the motor 6 in parallel with the operation of the main micro computer 110 and communicates results of the operation of the sub micro computer 120 to the main micro computer 110 in order to observe and recognize the operation of the main micro computer 110 to perform a supporting function supplementing needed information. The communication of data between the main and the sub micro computers 110, 120 are performed by the communication between the input/output interfaces 114, 124. After the vehicle driving is terminated, i.e. OFF of ignition switch, a source voltage $V_{cc}$, for example +5V, is charged from unillustrated stabilized source to maintain memory contents on the RAM 113, 123 and a EPROM 115. An output from each of the angle detector 101 of the handle shaft, the vehicle speed detector 102 and the angle detector 103 of the steering shaft is input into the input/output interface 114, 124 of the main and the sub micro computers 110, 120 through delivering. In this embodiment, every each detector is a rotary encoder and a counting signal from the rotary encoder is input directly into a digital data port of the input/output interface 114, 124 through an unillustrated Schmidt trigger portion. To the input/output interface 114 of the main micro computer 110 is connected to the solenoid 55, which is the driving portion of the lock mechanism 19, through the solenoid driver 56.

Figure 5:
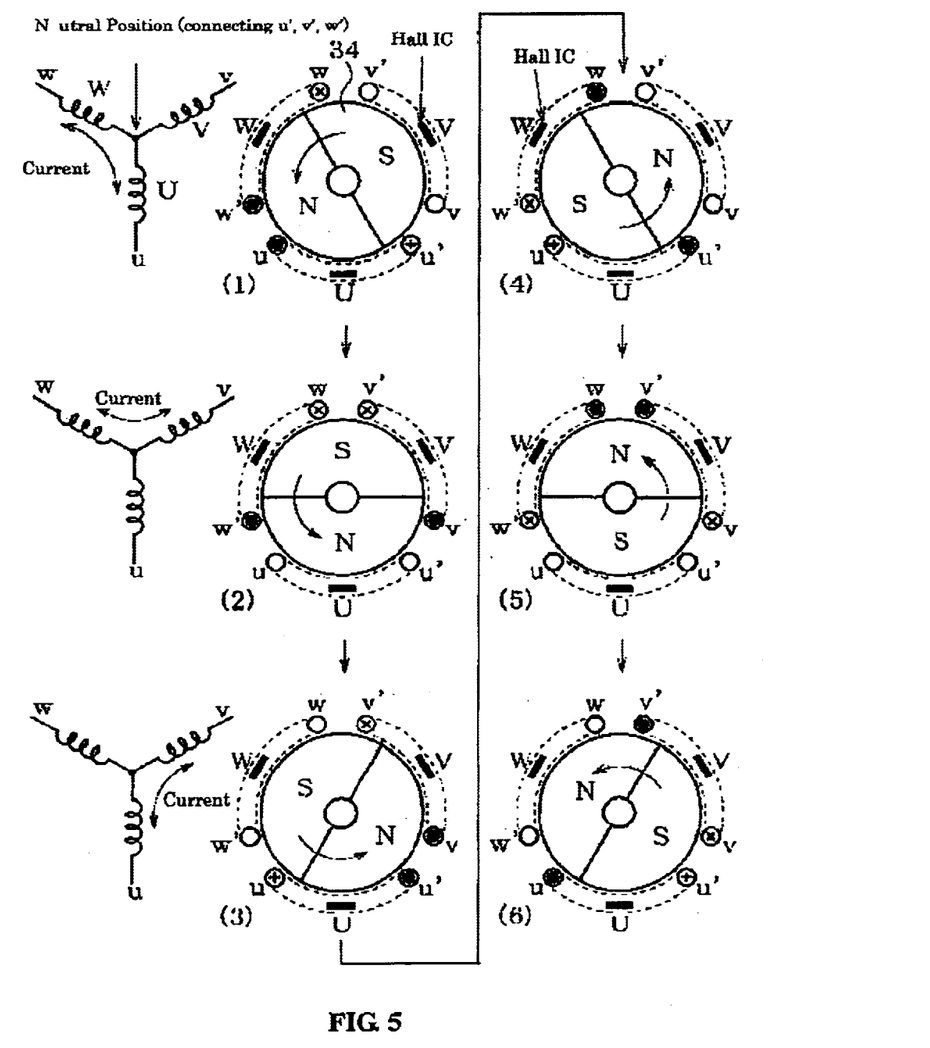
FIG. 5 is an operation diagram of a three phases brushless motor for using in an embodiment of the present invention.
Figure 8:
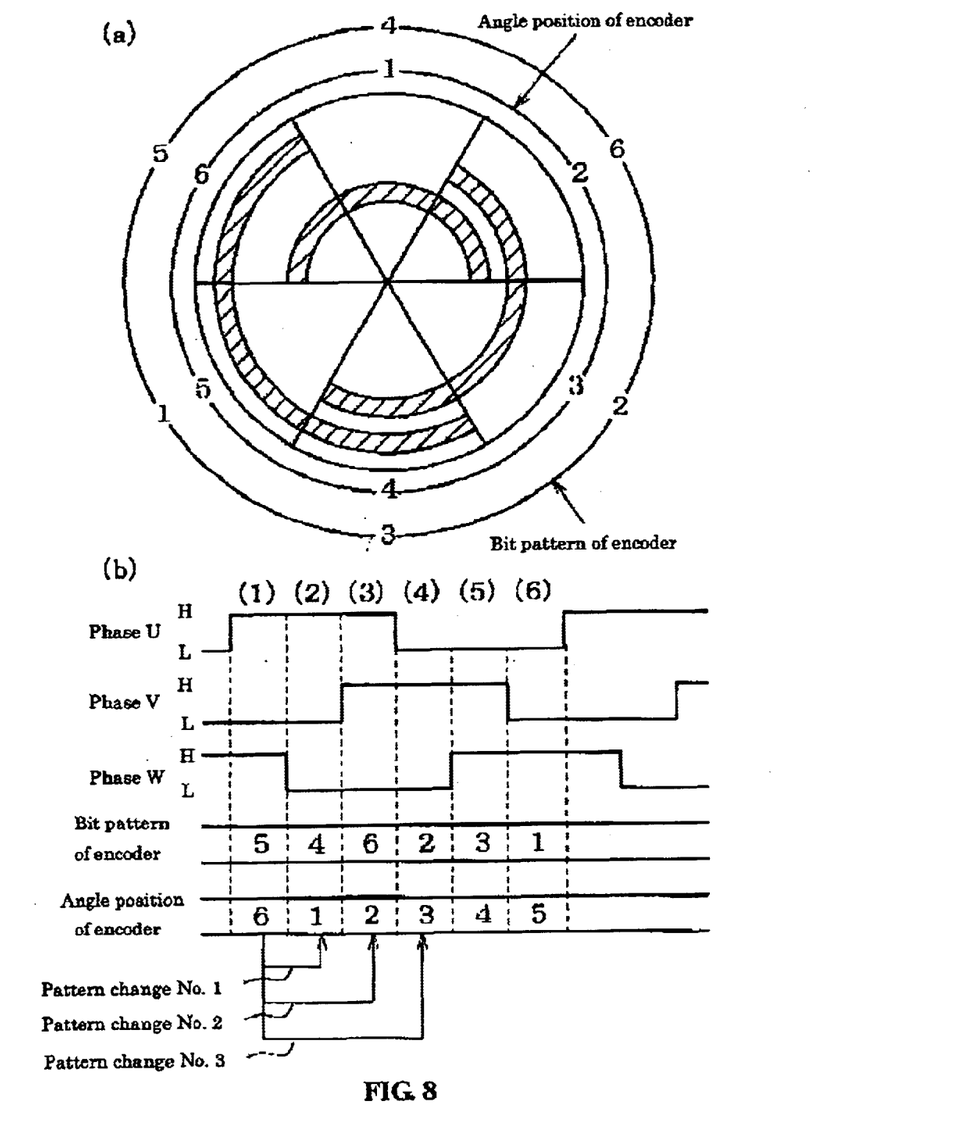
FIG. 8 is an explanatory diagram of a rotary encoder for using in the three phases brushless motor of FIG. 5.

Referring to FIG. 5, the motor 6 is a three-phase brushless motor and the coil 35, 35 described in FIG. 2 consists of a three-phase coil U, V, W disposed in 120° interval. A relative angular position between these coils U, V, W and the armature 34 is detected by a Hall IC being an angle sensor mounted in the motor. The motor driver 18 shown in FIG. 1 changes the current between coils U, V, W as W→U(1), U→V (3), V→W (5) circularly in clockwise and as reverse way thereof in counter clockwise. FIG. 8(b) shows a sequence of a current stage at each phase of coils in The clockwise and "H" shows the current stage and "L" shows an non-current stage. In the counter clockwise, the sequence is reversed left and right. A parenthesis numeral is an angular position of the armature 34 at the corresponding numeral in FIG. 5.

Figure 7:
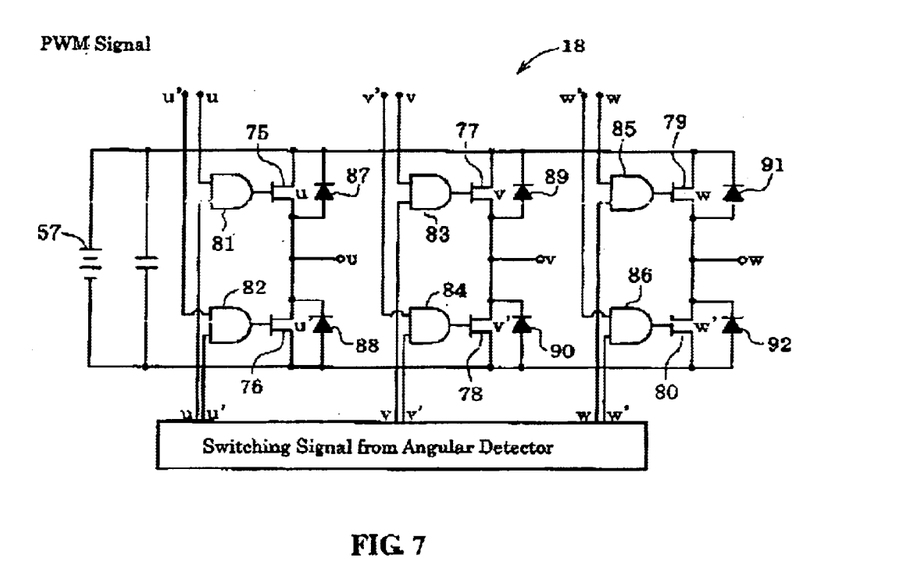
FIG. 7 is an example for a driver for a three phases brushless motor.

Returning to FIG. 4, the rotation of the motor 6 is controlled by overlapping the sequence of changing the current in each of phase of coils U, V, W to the sequence of a control of a duty ratio by a PWM signal from the steering controller 100, that is the main micro computer 110 in the embodiment. FIG. 7 shows an example of the circuit for the motor driver 18, and FETs 75–80 are corresponding to each terminal u, u', v, v', w, w' of coils U, V, W to be wired to construct a well known H-type bridge circuit. Numerals 87–92 shows flywheel diodes to construct a bypath passage of an induced current according to the change of coils U, V, W, AND gates 81–86 perform conjunction of a switching signal from the Hall IC of the motor and a PWM signal from the steering controller 100 to drive the switching of FETs 75–80, making the current by PWM selectively in the phase of the coil concerning about the current. The PWM signal is input into one of upper portion FETs 75, 77, 79 or lower portion FETs 76, 78, 80 of the H-type bridge circuit, it can be constructed to directly input the switching signal from the Hall IC without the correspondence of AND gate 81–86. Besides, a timing for sending a PWM signals sequentially to FETs 75–80 in the steering controller 100 may be recognized by distributing a signal from the Hall IC, but it is recognized by detecting by the rotary encoder as the angle detector individually equipped in this embodiment. The rotary encoder detects the rotational angle of the motor output shaft 36 and the detected angle thereby corresponds to the rotational angle of the motor output shaft 36 one by one. Therefore, the rotary encoder is equipped as the angle detector 103 of the steering shaft.

Referring to FIG. 8(a), a bit pattern, i.e. an angle identification pattern, is formed circumferentially on a disk of the rotary encoder to identify a coil current pattern, which is determined a time sequence of the current, in order to control the current sequence in the brushless motor. The bit pattern is a slit area marked by hatching in FIG. 8, plural slits formed circumferentially at the predetermined interval are classified three groups formed radially. A detector is an unillustrated permeation photo sensor, for example a photo coupler to detect the slit at each radial position for outputting the bit pattern identifying the angular phase of the disk. Since the embodiment of the present invention practices the three-phase brushless motor, six kinds of the bit pattern corresponding to the current pattern (1) to (6), showing in FIG. 5, is formed on the circumferential disk at 60° interval to perform the current sequence in coils U, V, W as shown in FIG. 8(b). Therefore, in accordance with the rotation of the armature 34 of the motor 6, said rotary encoder rotating therewith outputs the bit pattern identifying the predetermined coil flowed the current every moment. The steering controller detects the bit pattern from the encoder to determine itself the terminal of the identified coil, that is FETs 75–80, to have to send the PWM signal. Since the rotation of the motor output shaft 36 is transmitted to the steering shaft 8 by reduction, the motor output shaft 36 having the rotary encoder rotates at plural rotation during one turn of the steering shaft 8. Therefore, an absolute angular position of the steering shaft 8 can not determined from the bit pattern of the encoder showing only the absolute angular position of the motor output shaft 36. Therefore, as shown in FIG. 4, the RAM 113, 123 has a counter counting a detecting number of a variation of the bit pattern to be determined the angular position (θ) of the steering shaft. Therefore, the angle detector 103 of the steering shaft may be corresponded to an incremental rotary encoder as a function. Besides, since the absolute angular position of the motor output shaft 36, that is the armature of the motor 6, is detected by the kind of the bit pattern, a rotational direction of the motor output shaft 36, that is the direction of the handle, is determined by monitoring the changing sequence of the bit pattern. Therefore, the above-identified counter is added when the rotational direction of the steering shaft 8 is plus, and decreased when minus.

Figure 6:
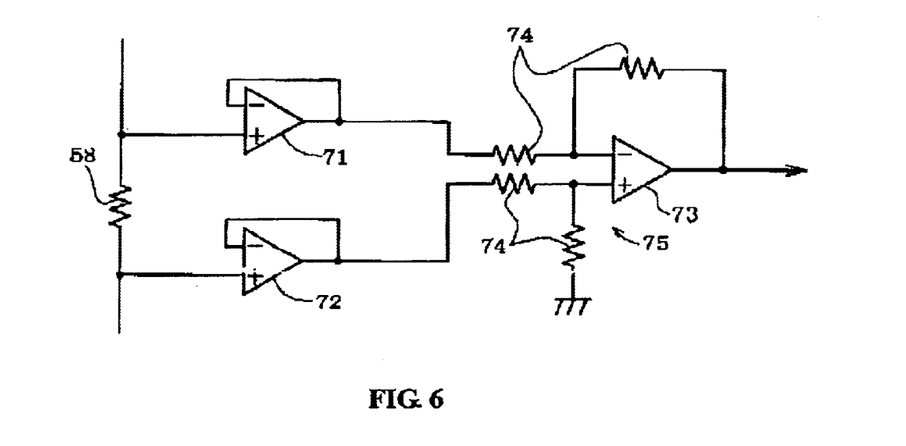
FIG. 6 is an example for a circuit of current sensor.

Referring to FIG. 4, a vehicle battery 57 is connected to the motor driver 18 for a power source of the motor 6. The source voltage $V_s$ of the battery 57 is changeable, for example 9 to 14V, according to a load state positioned at various place of the vehicle, a generating state by an alternator, and so on. The variable battery voltage $V_s$ is directly introduced as the power source without a stabilizing power circuit. The steering controller 100 equips a measuring portion 59 measuring the source voltage $V_s$ to control the motor 6 with the widely variable source voltage $V_s$. The measuring portion 59 consists of dividing resistance 60, 60 communicated to a bypass path at the upper steam of a charging line to the motor 6 to send a measured voltage signal. The measured voltage signal is smoothed by a condenser 61 to inputted into an input port with an A/D converter (referred to as an A/D port hereinafter) of the input/output interface 114, 124 through a voltage follower 62. A current detector is equipped on the charging line to the motor 6 to observe the current state of the motor 6 including a state of generation of overcurrent. The current detector consists of a shunt resistance 58 on the charging line and a current sensor 70, the current sensor 70 measures a voltage difference between both ends of the shunt resistance 58 to input thereof into the other A/D port of the input/output interface 114, 124. Referring to FIG. 6, the current sensor 70 introduces a voltage at both ends of the shunt resister 58 through a voltage follower 71, 72 to a differential amplifier 75 consisting of an operational amplifier 73 and resistances 74 to amplify and output. The output from the differential amplifier 75 is proportional to the current in the shunt resistance 58 to be able to be practiced as a measuring current $I_s$. The shunt resistance can be replaced to an electromagnetic probe detecting the current like a Hall element, a current detecting coil, and so on.

Backing to FIG. 4, RAMs 113, 123 of both micro computer 110, 120 have a memory area hereinafter:

(1) Measured vehicle speed memory: registering the measured present vehicle speed from the vehicle speed sensor 102.
(2) Counter memory for angular position ($\phi$) of the handle shaft: counting the counting signal from the rotary encoder being the angle detector 101 for the handle shaft and registering the counted value showing the angular position ($\phi$) of the handle shaft. The rotary encoder being able to detect the direction of the rotation is installed, the counter is added when the rotational direction of the steering shaft 8 is plus, and decreased when minus.
(3) Memory for a calculated steering angle converting ratio ($\alpha$): registering the steering converting ratio ($\alpha$) based on the measured vehicle speed.
(4) Memory for a calculated target angular position ($\theta'$) of the steering shaft: registering the target angular position ($\theta'$) calculated by $\phi*\alpha$ from values of the present angular position ($\phi$) of the handle shaft and the steering angle converting ratio ($\alpha$).
(5) Counter memory for the angular position ($\theta$) of steering shaft: counting the counting signal from the rotary encoder being the angle detector 103 for steering shaft, and registering the counted value showing the angular position ($\theta$) of steering shaft.
(6) Previously detected bit pattern: registering the bit pattern showing the previous angular position of the steering shaft.
(7) Presently detected bit pattern: registering the bit pattern showing the present angular position of the steering shaft.
(8) Memory for a calculated $\Delta\theta$: registering a calculated value of $\Delta\theta$ (=$\theta'-\theta$) which is a difference from the target angular position ($\theta'$) to the present angular position ($\theta$).
(9) Memory for measured source voltage ($V_s$): registering the measured source voltage ($V_s$) of the motor 6.
(10) Memory for determined duty ratio ($\eta$): registering the duty ratio ($\eta$) determined based on $\Delta\theta$ and the source voltage $V_s$ to flow the PWM current to the motor 6.
(11) Memory for measured current ($I_s$): registering the measured current $I_s$ by the current sensor 70.
(12) Memory for measured motor angle velocity: registering the value of the angle velocity of the motor.

The input/output interface 114 of the main micro computer 110 is connected to a EEPROM 115 as a second memory registering the angular position of the steering shaft 8 at a termination of driving, i.e. at OFF of ignition switch. Therefore, this angular position is a terminal angular position. At the first operation voltage (+5V) that the main CPU 111 read and write a data from and to the RAM 112, the main CPU 111 can read a data from the EEPROM 115. On the other hand, at the second operation voltage (for example +7V in the embodiment) lager than the first voltage, the main CPU 111 can write a data in order to prevent from re-writing contents at a malfunction of the main CPU 111. The second voltage generates an unillustrated pressure-up circuit between the EEPROM 115 and the input/output interface 114.

The operation of the steering control system for the vehicle will be explained hereinafter.

Figure 9:
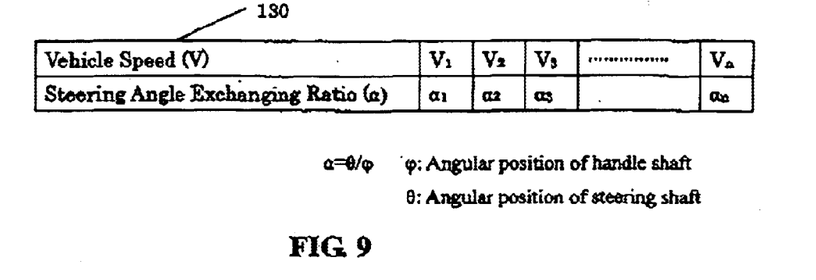
FIG. 9 is a schematic diagram table relating to a steering angle converting ratio versus vehicle speed.
Figure 10:
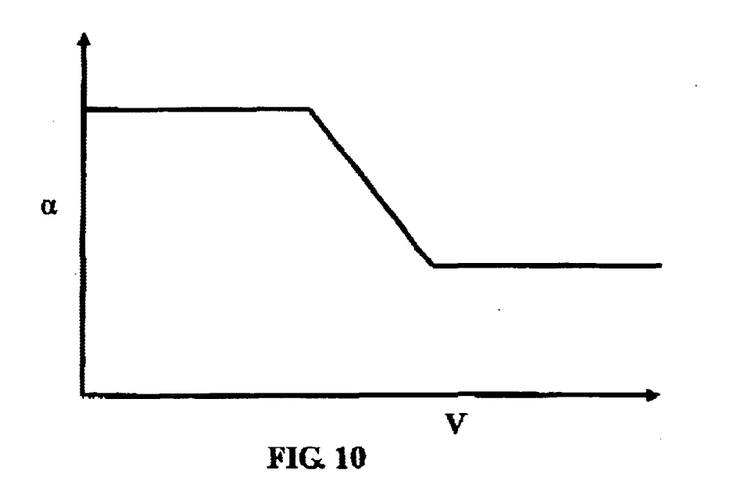
FIG. 10 is a schematic diagram showing an example for a pattern varying the steering angle converting ratio according to the vehicle speed.
Figure 12:
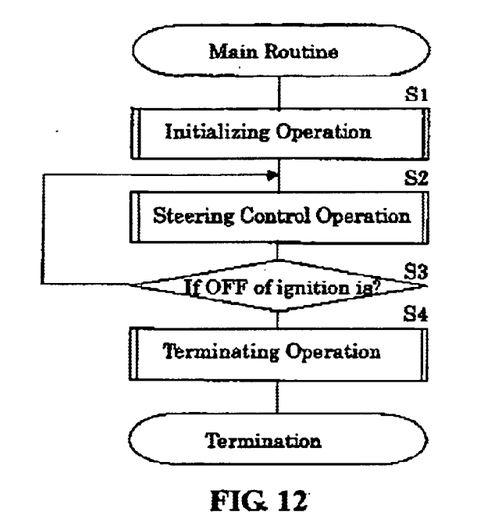
FIG. 12 is a flow chart to show an example of a main routine by a computer in the steering control system for a vehicle of the present invention.

In FIG. 12 is shown a flow chart of a main routine operation of the control program by the main micro computer 110. S1 is an initialized operation to be read the terminated angular position of the steering shaft 8 from the EEPROM 115 wrote at OFF of the ignition switch and to be set the terminated angular position as an initial angular position. The counted value of the terminated angular position is set in the counter memory for the angular position ($\theta$) of the steering shaft. A flag for termination of writing the data into the EEPROM 115 is cleared at this time. Next step is S2 for steering control operation. The steering control operation is performed periodically at a predetermined interval, for example hundreds micro seconds ($\mu$s), to average the interval of the parameter sampling. The detail of the steering control operation will be explained hereinafter referred to FIG. 13. The measured present vehicle speed V is read in S201, the angular position $\phi$ of the handle shaft is read in S202. In S203 is determined the steering angle converting ratio $\alpha$ exchanging the angular position $\phi$ of the handle shaft to the target angular position $\theta'$ of the steering shaft on the basis of the calculated vehicle speed V. The steering angle converting ratio $\alpha$ is set at different value according to the vehicle speed. In detail, the steering angle converting ratio $\alpha$ is set a small value at more than a predetermined value of the vehicle speed V and set a large value at a slow speed smaller than a predetermined value of the vehicle speed V as shown in FIG. 10. Referring to FIG. 9 in the embodiment of the present invention, the ROM 112, 122 have a table registered a preset value of the steering angle converting ratio $\alpha$ corresponding to various vehicle speeds V and the steering angle converting ratio $\alpha$ corresponding to the present vehicle speed V is calculated from the table 130 by a interpolated method. Although the vehicle speed V is practiced as an information pointed out the driving stage of the vehicle in the embodiment of the present invention, other information as a transversal force, road inclined angle and so on can be detected by a sensor to set the steering angle converting ratio $\alpha$. It can be practiced to determine a reference value of the steering angle converting ratio $\alpha$ according to the vehicle speed V and to compensate the reference value based on said other information in order to be calculated in above-mentioned method. In S204 is calculated the target angular position $\theta'$ by multiplying the detected angular position $\phi$ of handle shaft by the determined steering angle converting ratio $\alpha$. Then, the present angular position $\theta$ of steering shaft is read in S205. The angular position $\theta$ of steering shaft is practiced hereinafter. The angular position $\theta$ of steering shaft is calculated by the angular position counter of steering shaft as a counting signal of a change in the bit pattern from the rotary encoder shown in FIG. 8 and is determined from this counted value. The bit pattern detected in a previous period is latched in a memory or in a hardware so that said change of the bit pattern is determined by a coincidence a next inputting bit pattern with the latched previous bit pattern. Each bit pattern explains individually a rotational phase of the disk of the rotary encoder so that a rotational direction of the disk changes the sequence of the changed bit pattern. Therefore, the rotational direction of the handle is determined by recognizing the bit pattern to which the bit pattern is changed and it is determined whether the counter value is added or decreased.

Figure 14:
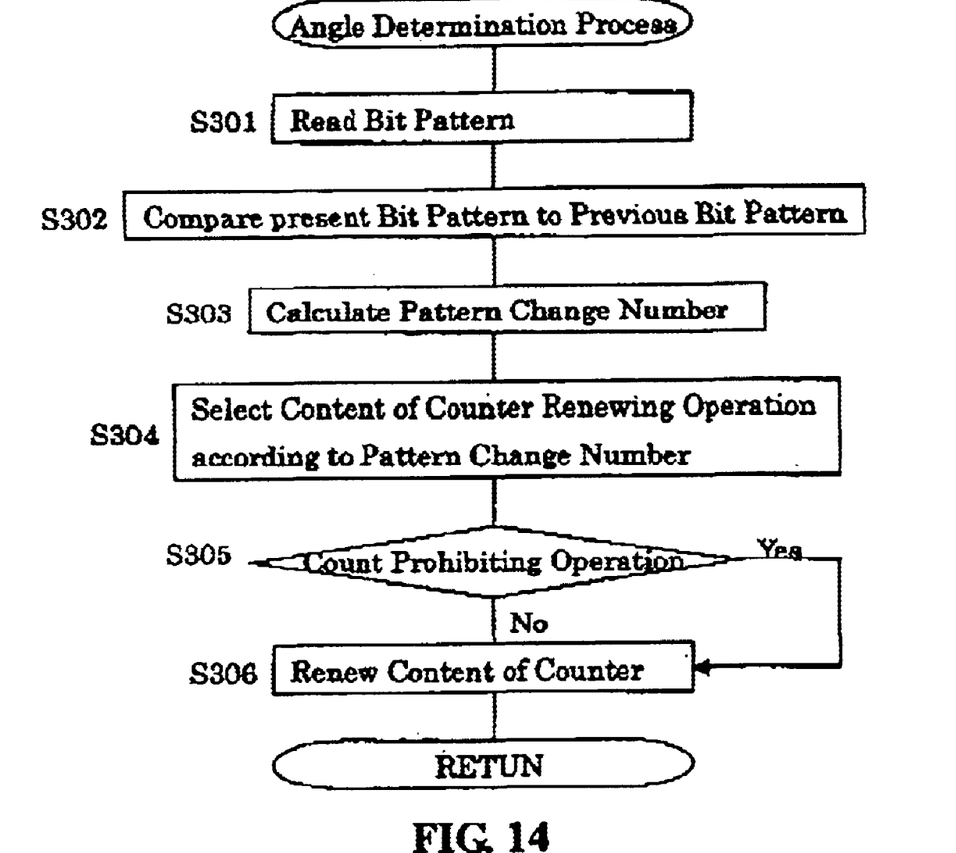
FIG. 14 is a flow chart to show a flow of an operation an angle determination.

Referring to FIG. 14, an angle determination process is performed by renewing the angular position counter of steering shaft according to a flow chart. The bit patter is practiced a sampling from the encoder as a second sampling and the result is registered in a predetermined memory area of the RAM 113, 123 shown in FIG. 4, on the other hand the result of sampling of the bit pattern at previous period as a first sampling is also registered in the RAM 113, 123. In S302, the bit pattern of the present sampling is compared to the bit pattern of the previous sampling. In detail, referring to FIG. 8(*b*), the angular position of the encoder 1 to 6 shows a bit pattern order, a difference of the determined pattern order in each sampling is calculated. In S303, a pattern change number is determined by a changed number changing from the previous sampling to the present sampling of the bit pattern on the basis of the calculated difference in S302. In S304, a content of the counter renew operation is selected according to the pattern change number. Where the selected operation is not a count prohibiting operation, i.e. an absolute value of the pattern change number at sampling interval is not larger than a reference number of the pattern change, next step goes to S305 to add or decrease the content of the counter according to the pattern change number. On the other hand, where the absolute value of the pattern change number is larger than the reference number, the count prohibiting operation is performed to prohibit to add or decrease the pattern change number to or from the counted value of the angular position counter of steering shaft. Therefore, the main CPU 111 or the sub CPU 112 performs the function of the count control means by a programming operation. The pattern change number is the pattern change number considered the rotational direction and is called an effective pattern exchange number that corresponds to an actual counter renewing number to be added in plus of a mark and to be decrease in minus of the mark. The calculation is performed by next theory hereinafter.

Where a pattern order of previous sampling is Q1, a pattern order of present sampling Q2, a total ordering number is NT, the pattern change number is $\delta N=Q2-Q1$ and the effective pattern exchange number is Y, (A) at $|\delta N|<N/2$, $Y=|\delta N|$ when the mark $\delta N$ is plus and $Y=-|\delta N|$ when the mark $\delta N$ is minus. Therefore, the mark of $\delta N$ coincides to the rotational direction itself.

(B) at $|\delta N|>N/2$, if a direction identified by the mark of $\delta N$ is the rotational direction, the encoder, that is an angle sensor or a motor is rotated more than ½ so that this rotation means an abnormal high rotation, therefore, it is natural to consider that the direction is the opposite direction to the direction identified by the mark of $\delta N$. Therefore, the opposite direction of the mark of $\delta N$ is the rotational direction. In opposite case to (A), the effective pattern exchange number Y is $Y=-(N-|\delta N|)$ at the plus of the mark of $\delta N$ and $Y=N-|\delta N|$ at the minus of the mark of $\delta N$.

According to the above explanation, the rotational direction is distinguished on the basis of large and small between $|\delta N|$ and $N/2$ and also on the basis of the mark of $\delta N$ where the pattern order difference by two samplings is $\delta N$. Besides, where $N/2$ is able to be a integer it can not be identified at $|\delta N|$ and $N/2$ whether the rotational direction is. However, there are two possible ways that the renewal of the counter is not performed by $\delta N$ or that the rotational direction is replaced with a rotational direction decided by the previous latest sampling. Next table 1 is an example of the content of the counter renewing operation.

TABLE 1

| $\delta N$ | Y |
|---|---|
| 0 | 0 |
| +1 (or −5) | +1 |
| +2 (or −4) | +2 |
| +3 (or −3) | Abnormality |
| +4 (or −2) | −2 |
| +5 (or −1) | −1 |

The embodiment of the present invention uses the three-phase motor, the encoder has another performance as the angle sensor detecting six angular positions of the motor 6 for the phase change shown in FIG. 5. Therefore, the total ordering number N is six and the effective pattern exchange number Y corresponding to the value of the difference $\delta N$ between each pattern order is determined based on the theory defined in (A) and (B). When $\delta N$ is zero, the counter is not renewed because no rotation of the motor. The absolute reference number of the effective pattern exchange number Y including the rotational direction is "2", the renewing operation performs to add or decrease the effective pattern exchange number Y to or from the counter. On the other hand, the value of Y is "3" corresponding to $\delta N=3$. This situation is over the reference number "2" so that it does not renew the counter as the abnormality. The situation of $\delta N=3$ corresponds to "N/2=the integral" so that it is selected the way that the renewal of the counter is not performed by Y.

In the above mentioned embodiment, the count prohibiting operation is automatically performed when the effective pattern exchange number Y exceeds the reference number, without according to a motor angle velocity $\omega$, i.e. the rotational velocity.

For the other embodiment of the present invention, an operation of changing the reference number is performed according to the motor angle velocity $\omega$ as explained hereinafter. The motor angle velocity is calculated from a changing of the angular positions registered in the angular position counter of steering shaft and is registered in a predetermined area of the RAM 113, 123 shown in FIG. 4. It is set as the greater the motor angle velocity is, the greater the pattern changing reference number to perform the count exhibition operation is. Examples shown in Table 2 and Table 3 will be explained hereinafter.

TABLE 2

| $\omega < \omega_s$ | |
|---|---|
| $\delta N$ | Y |
| 0 | 0 |
| +1 (or −5) | +1 |
| +2 (or −4) | Abnormality |
| +3 (or −3) | Abnormality |
| +4 (or −2) | Abnormality |
| +5 (or −1) | −1 |

TABLE 3

| $\omega > \omega_s$ | |
|---|---|
| $\delta N$ | Y |
| 0 | 0 |
| +1 (or −5) | +1 |
| +2 (or −4) | +2 |
| +3 (or −3) | Abnormality |
| +4 (or −2) | −2 |
| +5 (or −1) | −1 |

A first angle velocity scope defined $\omega<\omega_s$ where a limited value is $\omega_s$ and the limited value $\omega_s$ is for example 5 rad/s. A second angle velocity scope located at the side of greater angle velocity next to the first angle velocity scope defines $\omega>\omega_s$ where the limited value $\omega_s$ is within either scopes. The reference pattern exchange number is set as a predetermined first value, for example "1" in the Table 2 and is set as a predetermined second value, greater than the first value, for example "2" in the table 3. Therefore, the second angle velocity scope advancing greatly angles is allowed the larger absolute value of the effective pattern exchange number in the counter renewing operation.

Referring to next Table 4 to Table 7, another embodiment of the present invention will be explained hereinafter. In a scope of a larger angular position, the count prohibition operation can not be performed in accordance with the effective pattern exchange number including the rotational direction. For example, only where the larger motor angle velocity is predicted at a rapid handling, the renew of the counter is performed by the calculated effective pattern exchange number itself so that an accuracy of the calculated angular position of steering shaft is high.

TABLE 4

$\omega < \omega_{s1}$

| δN | Y |
|---|---|
| 0 | 0 |
| +1 (or −5) | +1 |
| +2 (or −4) | Abnormality |
| +3 (or −3) | Abnormality |
| +4 (or −2) | Abnormality |
| +5 (or −1) | −1 |

TABLE 5

$\omega_{s2} > \omega > \omega_{s1}$

| δN | Y |
|---|---|
| 0 | 0 |
| +1 (or −5) | +1 |
| +2 (or −4) | +2 |
| +3 (or −3) | Abnormality |
| +4 (or −2) | −2 |
| +5 (or −1) | −1 |

TABLE 6

$\omega > \omega_{s2}$; the previous rotational direction is "+"

| δN | Y |
|---|---|
| 0 | 0 |
| +1 (or −5) | +1 |
| +2 (or −4) | +2 |
| +3 (or −3) | +3 |
| +4 (or −2) | +4 |
| +5 (or −1) | +5 |

TABLE 7

$\omega > \omega_{s2}$; the previous rotational direction is "−"

| δN | Y |
|---|---|
| 0 | 0 |
| +1 (or −5) | −5 |
| +2 (or −4) | −4 |
| +3 (or −3) | −3 |
| +4 (or −2) | −2 |
| +5 (or −1) | −1 |

There are a third angle velocity scope ($\omega<\omega_{s1}$), a fourth angle velocity scope ($\omega_{s2}>\omega>\omega_{s1}$) located at the side of greater angle velocity next to the third angle velocity scope and a fifth angle velocity scope ($\omega>\omega_{s2}$) located at the side of greater angle velocity next to the fourth angle velocity scope in these Tables. Referring to Table 4, the reference number of the effective pattern exchange number is set as a predetermined third value "1" in the third angle velocity scope. Referring to Table 5, the reference number of the effective pattern exchange number is set as a predetermined fourth value "2" larger than the third value at fourth angle velocity scope. Referring to Table 6 and Table 7, the count prohibiting operation is not performed according to the effective pattern exchange number Y in the fifth angle velocity scope. Therefore, this another embodiment can improve the accuracy of the angular position of the steering shaft more greatly. Af the fifth angle velocity scope, if the rotational direction in the predetermined previous sampling, for example latest period of the sampling, is plus, the effective pattern exchange number Y is the larger value of |δN| and (N−|δN|) as shown in Table 6. If the rotational direction in the predetermined previous sampling, for example latest period of the sampling, is minus, the effective pattern exchange number Y is the smaller value of |δN| and (N−|δN|) with minus value as shown in Table 7. This is based on the reason that the previous rotational direction at the law handle rotation speed continues to the rotational direction at the high speed rotation when the motor is rotated at high speed as a rapid handle operation and so on.

Figure 11:
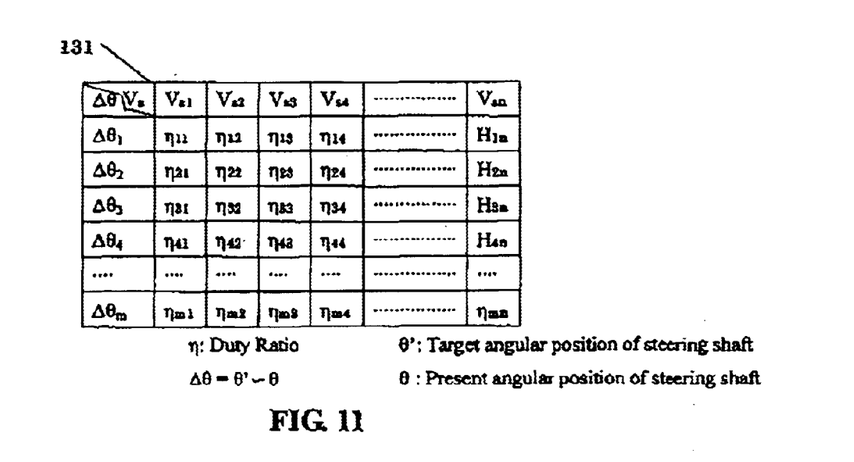
FIG. 11 is a schematic diagram of a two-dimensional table to decide a duty ratio by a motor power source versus angle deviation $\Delta\theta$.
Figure 13:
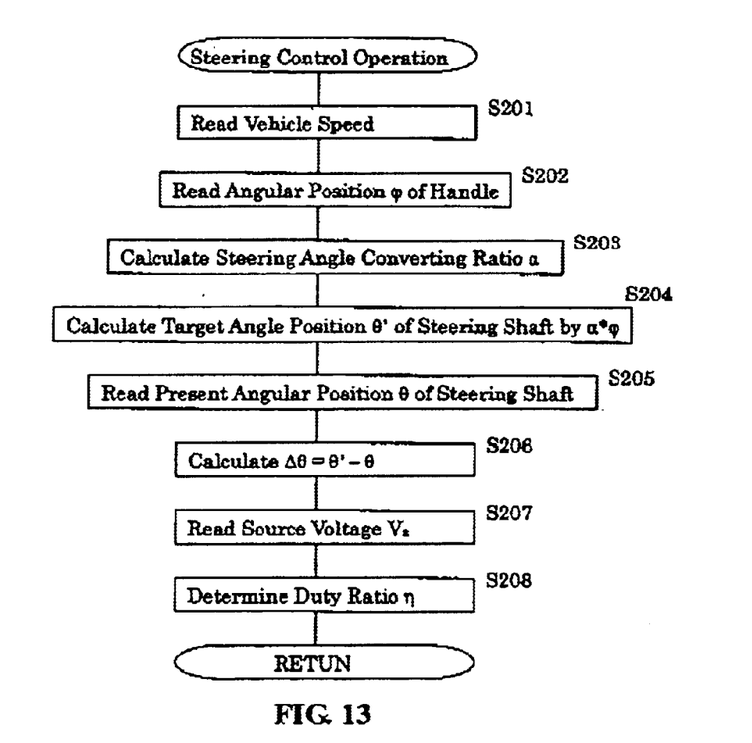
FIG. 13 is a flow chart to show an example of detail steering control operation in FIG. 12.

Back to FIG. 13 after the determination of the value in the angular position counter of steering shaft, a difference $\Delta\theta$ ($=\theta'-\theta$) between the target angular position $\theta'$ of steering shaft and the calculated angular position $\theta$ of steering shaft determined by the angular position counter of steering shaft is calculated in S206. In S207 is read a measured value of the present source voltage $V_s$. The motor 6 rotates the steering shaft 8 to decrease the difference $\Delta\theta$ between the target angular position $\theta'$ of steering shaft and the calculated angular position $\theta$ of steering shaft. The motor 6 is rotated at the large speed when $\Delta\theta$ is large and at the low speed when $\Delta\theta$ is small in order that the angular position $\theta$ of steering shaft approaches immediately to the target angular position $\theta'$. Therefore, this control depends proportionally on $\Delta\theta$ as a parameter. It may be reasonable to be controlled by a well known PID controller with a differentiation or an integration in order to restrain a overshoot or a hunching to stable the control. About next step S208, the motor 6 is controlled by PWM and the rotational velocity is adjusted by a duty ratio $\eta$ thereof. If the source voltage is constant the rotational velocity can be adjusted in dependence on only the duty ratio $\eta$. However, the source voltage of the embodiment of the present invention is not constant so that the duty ratio $\eta$ is determined based on the source voltage $V_s$. As shown in FIG. 11, the ROM 112, 122 register a duty ratio table 131 to determine the duty ratio $\eta$ in various combination with the source voltage $V_s$ and the measured value $\Delta\theta$ to determine the suitable duty ratio $\eta$ depending on the detected source voltage $V_s$ and the calculated $\Delta\theta$. The rotational velocity of the motor 6 is variable according to the load. Therefore, it can be useful to estimate a load stage on the motor 6 and to compensate the duty ratio $\eta$ on the basis of the measuring value of the motor current $I_s$ by the current sensor 70.

The above-mentioned operation is executed in the main micro computer 110 and the sub micro computer 120, that is to say in the main CPU 111 and the sub CPU 121, in parallel. The sub micro computer 120 supervises the main micro computer 110 by the way that the sub micro computer 120 checks calculated results registered in the RAM 123 thereof with contents sent periodically from the RAM 113 of the main micro computer 110 in order to find the abnormality.

The main micro computer 110 generates the PWM signal according to the determined duty ratio $\eta$. The main micro computer 110 controls the motor 6 in the PWM by sending the PWM signal to the FET (in FIG. 7) of the motor driver 18 switching the phase of the coil in the current referring to the signal from the rotary encoder in the angle detector 103 of steering shaft.

Backing to FIG. 12, whether the ignition switch is OFF or not is checked in S3 and a terminating operation is performed in S4. Where the ignition switch is OFF the driving of the vehicle is terminated. Therefore, the terminated angular position of the steering shaft 8 registered in the angular position counter of the main micro computer 110 is read to be registered in the EEPROM and a termination flag of a data writing is set in the RAM 113 and the operation is ended.

Obviously, numerous modifications and variations of the present invention are possible in light of the above teachings. It is therefore to be understood that within the scope of the appended claims, the present invention may be practiced otherwise than as specifically described herein.

What is claimed is:

1. A steering control system for a vehicle determining a steering angle sent to a steering shaft according to an operation angle of a handle shaft and a driving stage of the vehicle, and rotating the steering shaft by an actuator to create the steering angle, comprising:

an angle detector identifying a phase of a rotation angle of said shaft to determine an angular position of said steering shaft; and a steering controller receiving a pattern output of said identified angle phase from said angle detector, wherein said steering controller identifies a rotational direction of said angle detector based on said pattern output, performs a sampling of said pattern output at a predetermined interval, identifies an order of combination order of said identified pattern of said angle phase in a first sampling and a second sampling following to said first sampling, and determines a pattern exchange number with said rotational direction, said steering controller adds a number corresponding to said pattern exchange number to a counting number when said rotational direction is plus and decrease a number corresponding to said pattern exchange number from said counting number when said rotational direction is minus, and said steering controller has an angular position counter of steering shaft registers said angular position of steering shaft by said counting number.

2. The steering control system for the vehicle according to claim 1, wherein said steering controller includes a counter control means performing an prohibiting operation prohibiting said operation of adding or decreasing said pattern exchange number to or from said counting number in said angular position counter of steering shaft when an absolute number of said pattern exchange number is larger than a reference pattern exchange number.

3. The steering control system for the vehicle according to claim 2, wherein said steering control system for the vehicle further comprising an angle velocity detecting member to calculating an angle velocity of a rotatable member of said angle sensor, wherein said counter control means changes a set condition being set to perform said count prohibiting operation according to said calculated angle velocity.

4. The steering control system for the vehicle according to claim 3, wherein said counter control means set largely said pattern reference number for performing said count prohibiting operation according to an exceeding number of said angle velocity.

5. The steering control system for the vehicle according to claim 4, wherein said steering controller sets a first angle velocity scope and a second angle velocity scope located at the side of greater angle velocity next to said first angle velocity scope, said reference pattern exchange number is set a predetermined first value at said first angle velocity scope and is set a predetermined second value larger than said first value at said second angle velocity scope.

6. The steering control system for the vehicle according to one of claim 3 to claim 5, wherein said count control means does not perform said count prohibiting operation independent to said pattern exchange number when said angle velocity exceeds over a predetermined reference angle velocity.

7. The steering control system for the vehicle according to claim 6, wherein said steering controller sets a first angle velocity scope, a second angle velocity scope located at the side of greater angle velocity next to said first angle velocity scope and a third angle velocity scope located at the side of greater angle velocity next to said second angle velocity scope, said reference pattern exchange number is set a predetermined first value at said first angle velocity scope and is set a predetermined second value larger than said first value at said second angle velocity scope, and said count prohibiting operation is not performed independently to said pattern exchange number at said third angle velocity scope.

* * * * *